United States Patent
Martinez Pelayo et al.

(10) Patent No.: US 10,397,617 B2
(45) Date of Patent: Aug. 27, 2019

(54) GRAPHICAL DISPLAY CONTENT MONITOR

(71) Applicant: NXP USA, Inc., Austin, TX (US)

(72) Inventors: Ioseph Emmanuel Martinez Pelayo, Buda, TX (US); Michael Andreas Staudenmaier, Munich (DE); Brent Cameron Wylie, Austin, TX (US)

(73) Assignee: NXP USA, Inc., Austin, TX (US)

( * ) Notice: Subject to any disclaimer, the term of this patent is extended or adjusted under 35 U.S.C. 154(b) by 56 days.

(21) Appl. No.: 15/814,660

(22) Filed: Nov. 16, 2017

(65) Prior Publication Data

US 2019/0149847 A1 May 16, 2019

(51) Int. Cl.
| | |
|---|---|
| *H04N 19/86* | (2014.01) |
| *G06T 5/00* | (2006.01) |
| *G06K 5/00* | (2006.01) |
| *G06K 9/03* | (2006.01) |

(52) U.S. Cl.
CPC .............. *H04N 19/86* (2014.11); *G06T 5/005* (2013.01); *G06K 9/03* (2013.01); *G06T 2207/30168* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,679,077 | A * | 7/1987 | Yuasa | G08B 13/19602 340/518 |
| 7,937,723 | B2 | 5/2011 | Weissmueller, Jr. et al. | |
| 8,244,061 | B1 * | 8/2012 | Carson | H04N 5/21 348/251 |
| 8,441,574 | B2 | 5/2013 | Dunn et al. | |
| 8,477,193 | B1 * | 7/2013 | Rozenboim | H04N 7/183 348/143 |
| 2005/0263583 | A1 * | 12/2005 | Schlabach | G06Q 10/06 235/379 |
| 2011/0298843 | A1 * | 12/2011 | Hajjar | G09G 5/10 345/690 |
| 2013/0258077 | A1 * | 10/2013 | Bally | H04N 17/00 348/61 |
| 2016/0344475 | A1 * | 11/2016 | Kim | H04W 4/02 |

* cited by examiner

*Primary Examiner* — Marnie A Matt

(57) ABSTRACT

A display system includes a graphics controller, a difference injector, a display controller, a power measurement circuit, an arithmetic controller and an error detector. The graphics controller provides an image frame to the difference injector. The difference injector modifies the image frame by a known image artifact, and provides the image frame and the modified image frame to the display controller. The display controller displays the image frame and the modified image frame at a display screen. The power measurement circuit measures a first power characteristic of the display screen during the display of the image frame and a second power characteristic of the display screen during the display of the modified image frame. The arithmetic controller determines a differential power characteristic based on the first and second power characteristics. The error detector determines whether the differential power characteristics are indicative of the display of a known image artifact.

20 Claims, 5 Drawing Sheets

GRAPHICAL DISPLAY CONTENT MONITOR

FIELD OF THE DISCLOSURE

The present disclosure relates generally to digital systems and methods and more particularly to displaying graphical information on a display screen.

BACKGROUND

Many digital systems, for example, camera-based systems in automotive applications, display information to a user. Some or all of this information can be critical information that is considered important to be provided to the user. Examples of critical information can include images from cameras on a motor vehicle, and images generated to indicate vehicle speed, and other statuses. System requirements, for example safety requirements, may require that some action is to be taken by the display system should the critical information fail to be displayed.

Various techniques are known in the art for detecting a failure to display critical information. For example, a graphics source can compute a first hash value for an image to be displayed and a display controller can compute a second hash value for the image sent to the display. If the two hash values are the same, a system can have high confidence that the image provided by the graphics source is the same image that the display controller outputs. However, this type of system, based on characteristics of the image data alone, is unable to determine if the display actually succeeds in physically showing the image. For example, should a cable carrying image data from a display controller to a display fail, the display controller may provide the correct image data but the display will ultimately fail to receive the data and display it.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
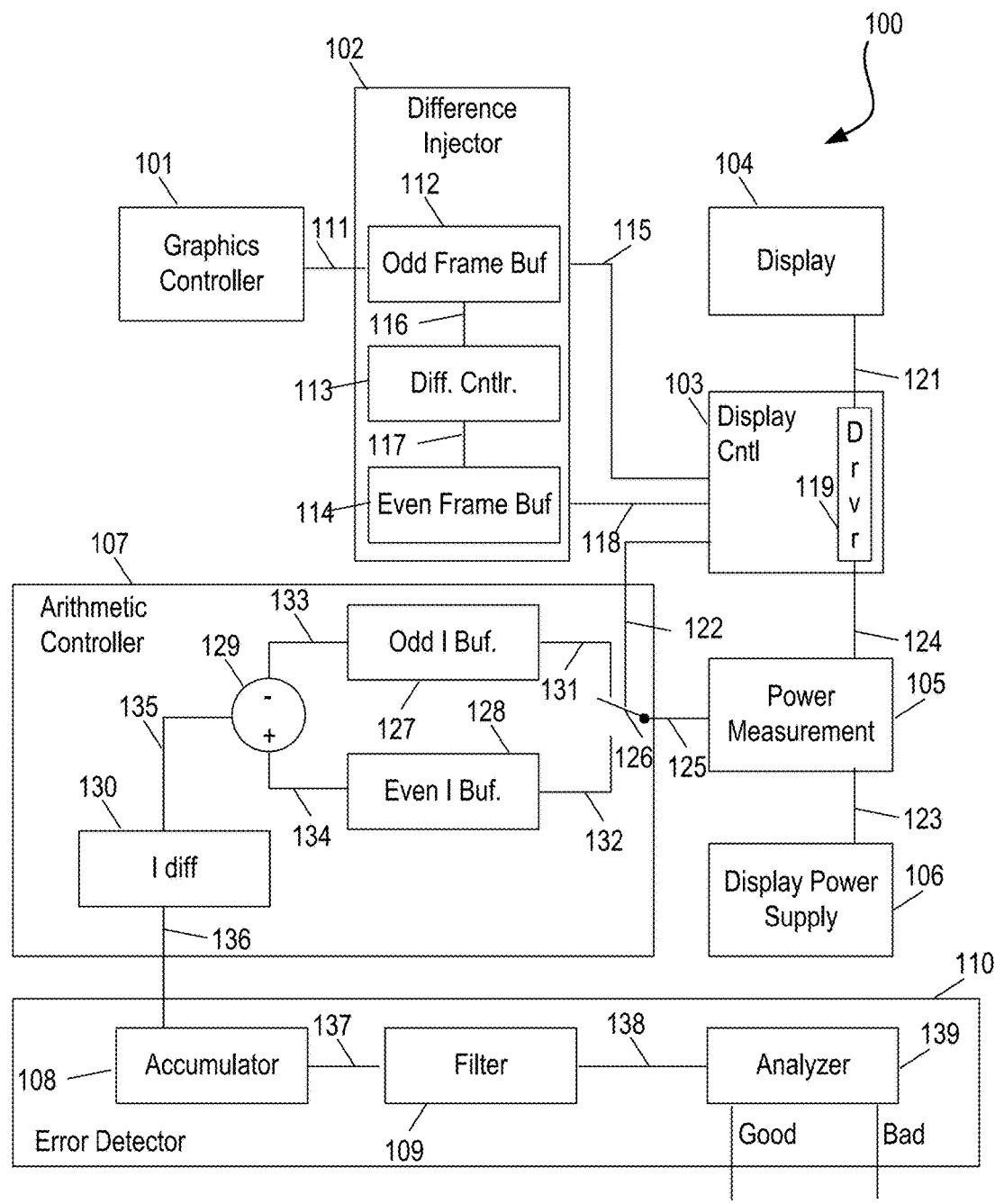
FIG. 1 illustrates a block diagram of a display system in accordance with an embodiment of the present disclosure.

In accordance with an embodiment of the present disclosure, a display system includes a graphics controller, a difference injector, a display controller, a power measurement circuit, a power supply, an arithmetic controller, and an error detector. The graphics controller can generate an image frame to be displayed on a display screen. The difference injector can modify the image frame by including a known image artifact resulting in a modified image frame. The display controller can sequentially display the image frame and the modified image frame. The power measurement circuit can measure a first power characteristic and a second power characteristic during respective display of the image frame and the modified image frame on a display screen of the display system. The arithmetic controller can determine differential power characteristics by calculating the difference between the first and second power characteristic measurements. The error detector circuit can detect whether the known image artifact has been displayed based upon the differential power characteristics.

An image frame displayed by a display system includes a plurality of pixels, wherein each pixel displayed is represented by a pixel value that can be processed by the display system. Each pixel value will be displayed at a corresponding pixel location on a display screen. Each pixel value in an image frame can thus be referred to by the location on a display screen at which the pixel value is to be displayed. Rectangular display screens can be organized into rows of pixels, with each row having the same number of pixels. The location at which a pixel value of an image frame is to be displayed can be inferred from the location of the pixel in the image information. For example, the first pixel value in an image frame can specify the pixel at the upper left corner of a rectangular display screen. The second pixel value of the image frame can specify the pixel immediately to the right of the first pixel. The third pixel value can specify the pixel to the right of the second pixel, and so forth until the end of the first row. The next pixel value can be displayed in the leftmost pixel of the second row of the display. Each succeeding pixel value can be displayed, from left to right and top to bottom, until the last pixel value of the image frame is displayed at the pixel at the lower right corner of the display screen. It will be appreciated that each pixel is driven during a specific time interval of a frame display period. Each pixel value defines a color and brightness of the location of a pixel on a display screen. A pixel value can be represented by several numerical values according to models well known in the art. For example, using the RGB color model a pixel value is specified by three numerical values, corresponding to the brightness of the colors red, green and blue that are to be displayed by the pixel. Other color models, such as Y Pb/Cv Pr/Cr, HSV (hue, saturation, value) and HSL (hue, saturation, lightness) can also be used to specify pixel values.

In order to display an image frame, a display screen can process the image frame one pixel at a time. For example, a display screen that displays 60 image frames per second must process all of the pixel values of an image frame within $\frac{1}{60}^{th}$ of a second. Power consumed by the display screen will vary based on a number of factors. In particular, the power consumed by the display at any particular time interval of a display period will be dependent on the pixel values of the pixels being processed during the time interval. Certain pixel values will cause the display screen to consume more power than other pixel values. For example, a particular display can consume more power when displaying pixel values representing brighter pixels than when displaying pixel values representing darker pixels.

Another source of variation in the power consumed by a display screen, however, is due to noise on the power supply connection of the display screen. Noise on the power supply connection manifests itself as random variations in the supplied voltage. For example, over a time interval encompassing the display of several image frames, or a portion of several image frames, the average value of noise on a power supply connection during that interval will tend to be constant or very slowly changing. As will be described herein, this characteristic of noise can be used to distinguish power consumption variation due to noise from power consumption variation due to the presence of an image artifact in a series of image frames.

The term "image artifact" as used herein indicates a change, introduced by a display system, to one or more characteristics of one or more pixels' values of an image that will be displayed on a display screen. For example, a logo can be in the corner of a video being displayed on a display screen that that was added to a received video signal by a display system. This logo can be considered an artifact in that it was not part of the received image. An image artifact need not, however, be perceptible to a viewer. In the present disclosure, image artifacts are injected into an image to alter the power consumption of a display screen displaying the image, and not for the purpose of displaying information to the user. In embodiments of the disclosure, the change to the image is small such that the image artifact is invisible or minimally visible to a viewer of the artifact.

Information processed by a display system can be formatted as a series of image frames that are displayed sequentially on a display screen, each image frame being displayed for a predetermined period of time, e.g., based on a frame display period. For example, a display screen may have a frame display period corresponding to $\frac{1}{60}^{th}$ of a second. The series of images displayed can be perceived by a user as a single, possibly moving, image.

The present disclosure describes a display system that relies on operating characteristics of the display screen itself to provide assurance that the display system is operating properly. In particular, a display system can measure the power consumed by a display screen, such as an LCD panel or a projector as it displays information. The display system can inject an image artifact into the displayed information that, when displayed at the display screen, will alter the power consumption of the display screen in a known manner under ideal circumstances. For example, the luminance of a set of pixels in the displayed information can be altered in a manner that increases the power consumed by the display by a known amount. The display system can measure the power consumed by the display when displaying frames with and without the artifact, and, upon detecting a difference in power consumption between the frames, the display system can determine with a high degree of certainty that the display system is operating properly.

FIG. 1 illustrates an embodiment of a display system 100 that displays images. Display system 100 includes graphics controller 101, difference injector 102, display controller 103, display screen 104, power measurement circuit 105, display power supply 106, arithmetic controller 107, and error detector 110. According to an embodiment, graphics controller 101, difference injector 102, display controller 103, power measurement circuit 105, arithmetic controller 107, and error detector 110 are integrated at common semiconductor substrate or package.

Graphics controller 101 can be configured to generate image frames for display to a user. In various embodiments, graphics controller 101 can be an image processor, a general-purpose processor, custom graphics circuitry, or the like. In an embodiment, graphics controller 101 can include a plurality of image sources and can merge images from the plurality of image sources into a composite image. In an embodiment, graphics controller 101 generates a series of image frames based upon received image and data information. For example, graphics controller 101 can generate image frames from a camera at a rate corresponding to the refresh rate for display screen 104. In an embodiment, graphics controller 101 can generate image frames at half the display rate of display screen 104. Image frames generated by graphics controller 101 are provided to difference injector 102 via image frame connection 111.

Difference injector 102 is also connected to display controller 103 by odd image frame connection 115 and even image frame connection 118. It will be appreciated that the odd image frame connection and even image frame connection can be a single connection, and that they are shown separately for ease of discussion. Difference injector 102 includes odd frame buffer 112, difference controller 113 and even frame buffer 114. Odd frame buffer 112 is connected to graphics controller 101 by image frame connection 111, to display controller 103 by image frame connection 115, and to difference controller 113 by image frame interconnect 116. Difference controller 113 is connected to even frame buffer 114 by image frame connection 117. Even frame buffer 114 is connected to display controller 103 by even image frame connection 118. Difference injector 102 is configured to receive and store image frames from graphics controller 101 to the odd frame buffer 112, which in turn sequentially provides the image frame to the display controller 103 during an odd time interval. Difference injector 102 further provides a modified version of the odd image frames to the even frame buffer that is then provided from the even frame buffer 114 to the display controller 103 during a subsequent even time interval.

Display controller 103 includes display driver 119. Display controller 103 is further connected to power measurement circuit 105 by power connection 124, to arithmetic controller 107 by frame indicator connection 122, and to display screen 104 by display screen connection 121. Display controller 103 processes image frames received at odd image frame connection 115 and even image frame connection 118 and provides signals conveying information based on pixel values in the received image frames to display screen 104 via display screen connection 121. Display controller 103 further receives power for display screen 104 from interconnect 124 that is connected to power measurement circuit 105 via power connection 123 that provides power to display screen 104.

Display screen 104 is connected to display controller 103 by display screen connection 121. Display screen connection 121 includes connections that provide power to display screen 104 and signals conveying pixel values for image frames to display screen 104. Display screen 104 generates images based on signals provided by display controller 103. For example, as described previously, a series of pixel values can be used to control the display of pixels of an image frame beginning at the top left of the image and ending at the lower right of the image. Power consumed by display screen 104 as pixels are displayed can vary based on their pixel values. For example, pixel values indicating a bright pixel can cause display screen 104 to consume more power than pixel values indicating a dark pixel.

Power measurement circuit 105 is connected to display power supply 106 by power connection 123, to display controller 103 by power connection 124, and to arithmetic controller 107 by measurement data connection 125. A voltage or current indicative of electrical power provided by display power supply 106 to the display screen can vary as discussed previously. Power measurement circuit 105 provides, via measurement data connection 125, an indication of power consumed via power connection 124 that corresponds to power consumption of the display screen 104. In an embodiment, power indications are provided at measurement data connection 125 indicative of the power consumption of the display screen 104 at defined intervals. For example, a power indicator can be provided at time intervals corresponding to the display individual pixels by display screen 104. In another embodiment, power consumption indications are provided at time intervals corresponding to the display of a plurality of pixels of display screen 104.

Arithmetic controller 107 is connected to power measurement circuit 105 by measurement data connection 125, to display controller 103 by frame indicator connection 122, and to error detector 110. Arithmetic controller 107 is illustrated to include switch 126, odd frame measurement data buffer 127, even frame measurement data buffer 128, difference calculator 129, and measurement difference buffer 130. Switch 126 is connected to frame indicator connection 122 to receive an indicator from display controller 103 as to whether an odd or even frame is currently being displayed. Based on the received indicator, switch 126 provides measurement data from power measurement circuitry 105 to either the odd frame measurement data buffer 127 via measurement data interconnect 131 or to even frame measurement data buffer 128 via measurement data interconnect 132. One or more power measurements corresponding to different time intervals during which a frame is being displayed can be received for each frame and stored at its corresponding measurement buffer. Thus, odd frame power measurement data buffer 127 stores a set of one or more measurements corresponding to each odd image frame, and even frame power measurement data buffer 128 stores a set of one or more measurements corresponding to each even frame. Power information from the data buffers 127 and 128 can be provided to difference calculator 129 via measurement data connections 133 and 134. Difference calculator 129 subtracts corresponding measurements from the even and odd buffers 128 and 127, and provides the difference as a set of measurement values at measurement data connection 135. It will be appreciated that in a properly operating ideal system the power difference observed between an odd frame and an even frame pair will vary only by the difference in power needed to display the image artifact. Power measurement difference buffer 130 receives the set of power difference measurement values via measurement data connection 135 and stores the set. Power measurement difference buffer 130 provides the stored set of measurement data at connection 136.

Error detector 110 includes an accumulator 108, a filter 109, and analyzer 139. Accumulator 108 is connected to arithmetic controller 107 by measurement data connection 136 and to filter 109 by measurement data connection 137. Accumulator 108 receives power difference measurement values for each measured time interval calculated from each frame pair, and adds these measurements to an accumulated value that corresponds to the same time interval. Thus, each accumulated value of the set is for a common image frame portion. The accumulated values can then be provided to the filter 109 via measurement data connection 137. It will be appreciated that the way the accumulator 108 accumulates information can vary.

According to an embodiment, accumulator 108 can accumulate power difference measurement data for a predetermined number of paired image frames, e.g., an image frame and modified image frame. For example, accumulator 108 can compute a sum based on a most recent set of power difference measurements for 100 or more frame pairs. An actual number of frames pairs over which to differential power data is accumulated can depend based upon on the level of noise, for example power supply noise, as compared to a difference in display power between frames due to an inserted image artifact. The number of power measurement difference data sets is to be sufficiently large to allow the power difference based upon the inserted image artifact to be detected over the accumulated random noise after being filtered by filter 109. The accumulator 108 can then discard the accumulated value and begin accumulating a new set of measurement difference data sets.

In another embodiment, accumulator 108 can employ a circular buffer to maintain only the most recent measurement difference data sets. In other embodiments, accumulator 108 can employ operations in place of or in conjunction with simple addition. For example, accumulator 108 can employ a weighting algorithm that places more emphasis on recent measurement difference data sets. Such an algorithm can be implemented by multiplying measurement data sets by weighting factors and summing the resulting products. Other means well known in the art of processing data to emphasize weak features or to minimize noise can be used with the present disclosure.

Filter 109 is connected to accumulator 108 by measurement data connection 137 and to analyzer 139 by measurement data connection 138. Filter 109 filters the accumulated differential values to reduce random and known noise. By accumulating the differential power information of a plurality of frame pairs the signal to noise ratio of the accumulated measurement improves, allowing filtering to more efficiently highlight differences in power that are expected due to the image artifact. For example, the filter 109 can focus on removing noise or other uncorrelated information with regards the displayed difference in the pixels corresponding to the image artifact. For example, a technique referred to as Differential Power Analysis can used to detect very small variations over a long period of time or repetitive measurements.

In addition to merely filtering to detect the differences in power, the filter 109 can implement other types of filtering. For example, should the output of display power supply 106 have noise at a known frequency of a clock signal in the display system, filter 109 can be configured to attenuate the clock signal frequency in the received set of measurement values. Filter 109 provides the filtered set of measurement values to analyzer 139 via measurement data connection 138. Analyzer 139 receives the filtered set of measurement values at measurement data connection 138 and analyzes the received set of filtered differential power information for indications of an image artifact. For example, display of an image artifact at a known location of the display can generate expected values in the received set of differential power measurement values that the analyzer can detect. In response to detecting values indicating display of the image artifact the analyzer can indicate a 'Good' result, while in response to not detecting such values can indicate a 'Bad' result.

Figure 2:
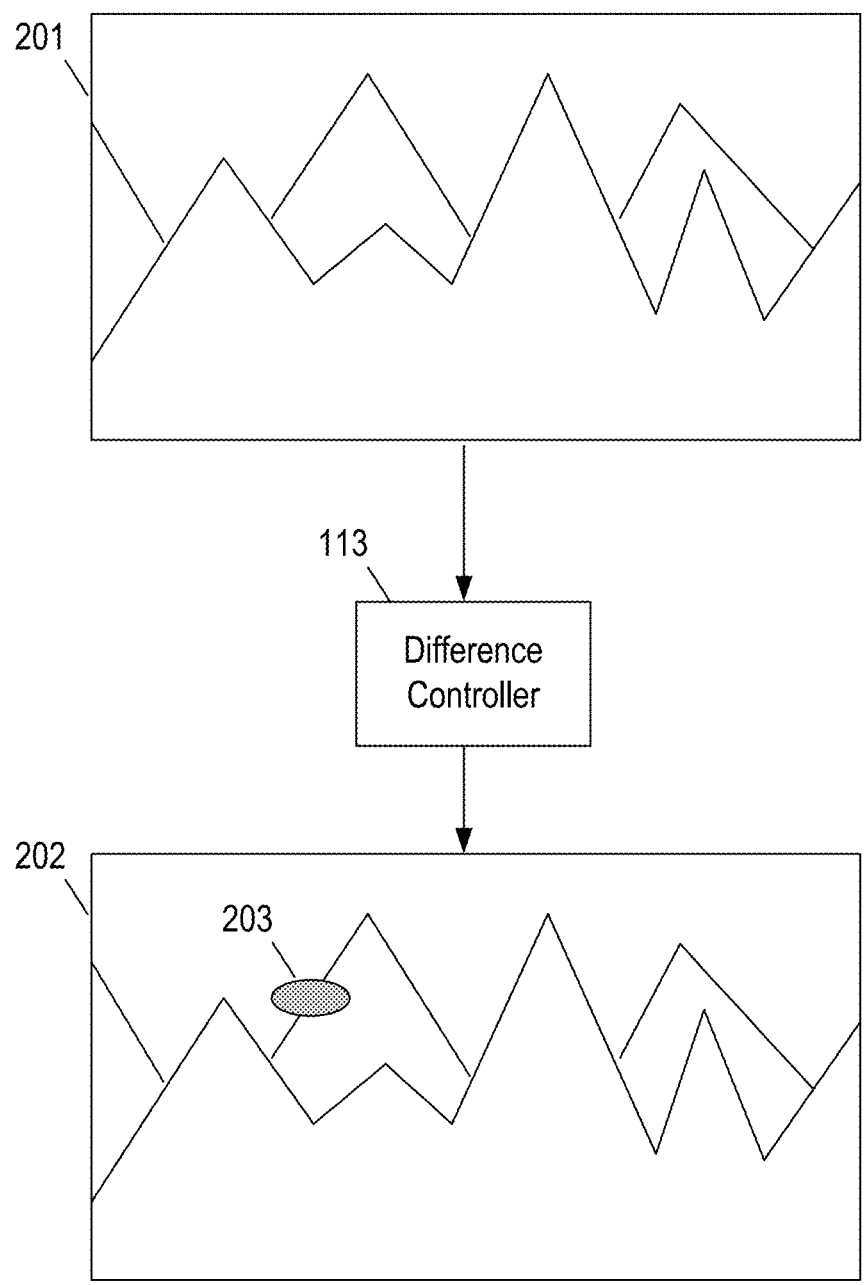
FIG. 2 illustrates an image that has been modified by a difference controller in accordance with an embodiment of the present disclosure.

FIG. 2 illustrates the operation of difference injector 102 from the perspective of an image frame. Image frame 201 represents an image frame provided by graphics controller 101 and stored at odd frame buffer 112. The image frame stored at Odd frame buffer 112 is provided to display controller 103 via odd image frame connection 115 for display, and to difference controller 113 for modification. Difference controller 113 injects image artifact 203 into image frame 201 to produce modified image frame 202, which is stored at even frame buffer 114, from where it is provided to display controller 103 via even image frame connection 118 for display. According to an embodiment, the location of the artifact can be randomly selected so long as the location and manner of modification is provided to the analyzer 139. In another embodiment, the location of the image artifact resides at at least one pixel at which safety critical information is displayed. The image artifact can include a plurality of individual artifacts. For example, an image artifact can include a plurality of individual artifacts, e.g., one at each corner of an image frame where safety critical information is displayed.

As discussed previously, difference injector 102 receives a single frame and provides two image frames for display. Thus, the difference injector may be referred to as a frame doubler. Those skilled in the art will appreciate that a similar function can be achieved using other hardware configurations. In an embodiment, a graphics controller can provide image frames such that an image frame can be provided to a display controller through a difference injector and to a difference controller within the difference injector simultaneously, removing the need for an odd frame buffer. In another embodiment, a difference injector can inject an image artifact into alternate frames received at its input. In such an embodiment, the difference injector is not a frame doubler and can simply alter pixel values as they pass through the difference injector without a need to buffer image frames. In an embodiment, odd frame path 115 and even frame path 118 can be implemented as a single data path between a difference injector and a display controller, with odd frames and even frames provided alternately.

Upon receiving image frames from difference injector 102, display controller 103 (FIG. 1) processes image frames in preparation for display at display screen 104 by producing signals used to display the image frames. Functions performed by display controller 103 vary depending on the color model of the image frames and the input requirements of display screen 104. These functions are well understood in the art. By way of example, image frames can be provided using the RGB color model and the display screen can accept pixel data indicating the intensity of red, green and blue LEDs in the display. In such a system, conversions required by display controller 103 are relatively simple. In another embodiment, display screen 104 can require red, green and blue pixel value inputs while the color model used for the image frames is Y Pb Pr. In this embodiment, display controller 103 provides a conversion between the color model of the image frame and the requirements of display screen 104.

In an embodiment, display controller 103 processes image frames in a sequence in which the image frames are received from difference injector 102. In an embodiment, image frames received at odd image frame connection 115 and even image frame connection 118 are processed alternately. In an embodiment, pixel values composing an image frame are processed sequentially. Display of an image frame at display screen 104 takes a substantially similar amount of time regardless of the content of the image frame, e.g., each image frame is displayed during an individual frame display period. In particular, during the display of a particular image frame, individual pixels are driven at the display screen 104 during a time interval that is at a time offset relative to the start of displaying the image frame being displayed.

Display controller 103 provides a frame indicator at frame indicator connection 122 that indicates the start of an image frame being displayed, and an indication as to whether the frame is an odd frame or an even image frame. The frame indicator can be used by the arithmetic controller 107 to differentiate between power measurement data for odd and even image frames as previously discussed. The indicator can be provided in a variety ways known in the art. In an embodiment, frame indicator connection 122 can have a high value when an odd frame is being processed and a low value when an even frame is being processed. In another embodiment, a low to high transition can be provided on frame indicator connection 122 when processing begins for an image frame.

Display controller 103 includes display driver 119. A signal corresponding to the pixels to be displayed is provided by the driver 119 to the display unit 104. In an embodiment, display driver 119 provides pixels as digital data as a series of bits on a digital connection to display screen 104. In another embodiment, display driver 119 provides pixel values as analog signals (e.g., as voltages) indicating the intensity of colors, for example red, green and blue, to be displayed for a pixel. In addition to providing pixel values, display driver 119 provides power to display screen 104. Display driver 119 receives power from power measurement circuit 105 and supplies power to display screen 104, wherein the power consumption of the display driver 119 is directly affected by the state of the individual pixels of the display. Thus, under ideal circumstances, there would be a measurable difference in the power consumption of the display when displaying an odd image frame as compared to when displaying an even image frame, which includes the image artifact.

Power measurement circuit 105 monitors power from display power supply 106 that is consumed by the display screen 104. Power measurement circuit 105 measures a power characteristic of the power consumed by display screen 104 and provides power measurement data of this power characteristic to arithmetic controller 107. A power characteristic can include a power level, a current flow, a voltage, the like, and combinations thereof. In an embodiment, power measurement circuit 105 measures a current flow of an image currently being provided to display screen 104, which can correspond to the power of driver 119. As used herein the term "current image" is intended to refer to the image frame currently being displayed on a display screen. In an embodiment, power measurement data provided by the power measurement circuit 105 is a sequence of digital values indicating power provided to display screen 104 during a series of time intervals, which for purpose of discussion are presumed to correspond to the display of individual pixels at display screen 104.

Arithmetic controller 107 receives power measurement data from power measurement circuit 105 as previously described.

Figure 3:
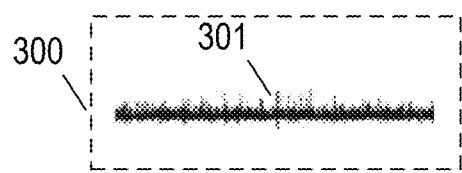
FIGS. 3-6 are graphical representations of power characteristics in accordance with an embodiment of the present disclosure.
Figure 4:
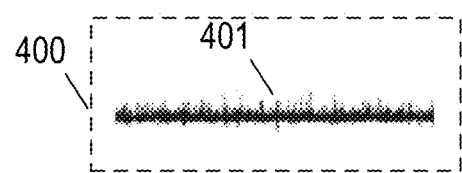
Figure 5:
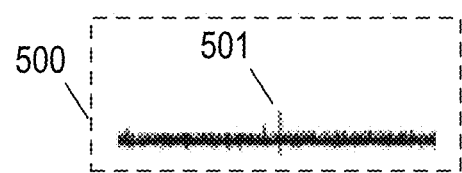

FIGS. 3-5 show graphical representations of power measurement data as the data processed by arithmetic controller 107 for a single odd/even frame set. FIG. 3 shows power measurement data graph 300 for an even frame that includes the image artifact. Each discrete point of the horizontal axis represents a unique time interval during the display of an even image frame, including an image artifact, by display screen 104. For example, the left most data point can represent the time during which an initial pixel is displayed, the next data point can represent the time interval during which a second pixel is being displayed, and so on. The horizontal region identified generally by reference numeral 301 can indicate the general time interval, or intervals, during which the image artifact added to the image frame is being displayed. The vertical axis represents the amount of power consumed by the display screen as measured by power measurement circuit 105. The power measurements illustrated at power measurement data graph 300 include contributions from noise, for example, power supply noise as discussed previously, from the image artifact, and from the original image. It will be appreciated that in FIG. 3, the incremental power of the image artifact at 301 cannot be detected.

FIG. 4 shows power measurement data graph 400 for the odd frame that corresponds to the even frame of FIG. 3. As such, it will be appreciated that during time interval 401, which is the same relative time interval as time interval 301, the artifact that was displayed as part of the even frame characterized by FIG. 3 is not displayed as part of the odd frame characterized by FIG. 4. As with the power measurements illustrated at FIG. 3, power measurements illustrated at power measurement data graph 400 also include contributions from noise. Because of the noise present during a single frame, the measurements at FIG. 4, as compared to the measurements of FIG. 3, lack an observable indication of difference in power consumption at time 401, corresponding to the display of the image artifact.

Figure 6:
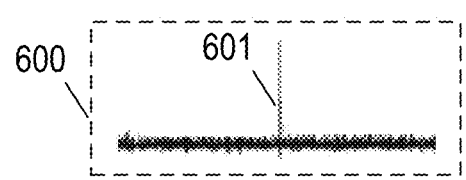

FIG. 5 shows power measurement data graph 500, illustrating the difference between the data shown at power measurement data graph 300 and power measurement data graph 400, such as can be determined by difference calculator 129. It will be appreciated that under ideal circumstances, the difference between and even frame and an odd frame would be zero (0) for each time interval, except for the time interval(s) where the artifact is being displayed. In FIG. 5, however, because power supply noise is random in nature, the difference between the power of the individual odd frame of FIG. 3 and the individual even frame of FIG. 4 itself includes a noise component that prevents detection of artifact at time interval 501, which corresponds to time intervals 301 and 401, from detected, even though a small difference is shown for purposes of clarity. However, by virtue of being random in nature, the power supply noise will tend to average out over time. Thus, accumulating the differential values for each interval over a sufficiently long period of time, e.g., number of frames, as shown at FIG. 6, will reduce the effects of noise, making the presence of the artifact at time interval 601 more pronounced, and therefore detectable. Thus, because the effects of noise have been averaged out over time, the increased power consumption at time 601 is indicative of proper display of the artifact.

It will be appreciated that the results illustrated FIG. 6 may be detected without filtering, provided a sufficient number of frames are accumulated. Alternatively, filtering can be used to further attenuate noise in the accumulated differential power signal, which can facilitate using fewer frames than would otherwise be needed.

Filter 109 provides the filtered power measurement data to analyzer 139, which can determine whether the differential power measurement data indicates that an image artifact was displayed by display screen 104. Analyzer 139 can make a determination, for example, by determining if the relative magnitude of the signal at 601 is sufficiently different than for other time intervals not including the artifact. Analyzer 139 can provide an output indicating "Good," indicating that the power analysis was consistent with the known image artifact having been displayed and a second output indicating "Bad," indicating that the power analysis was not consistent with the known image artifact having displayed. In various embodiments, outputs of analyzer 139 can provide only a good indication, only a bad indication, or a single output indicting both good and bad.

Figure 7:
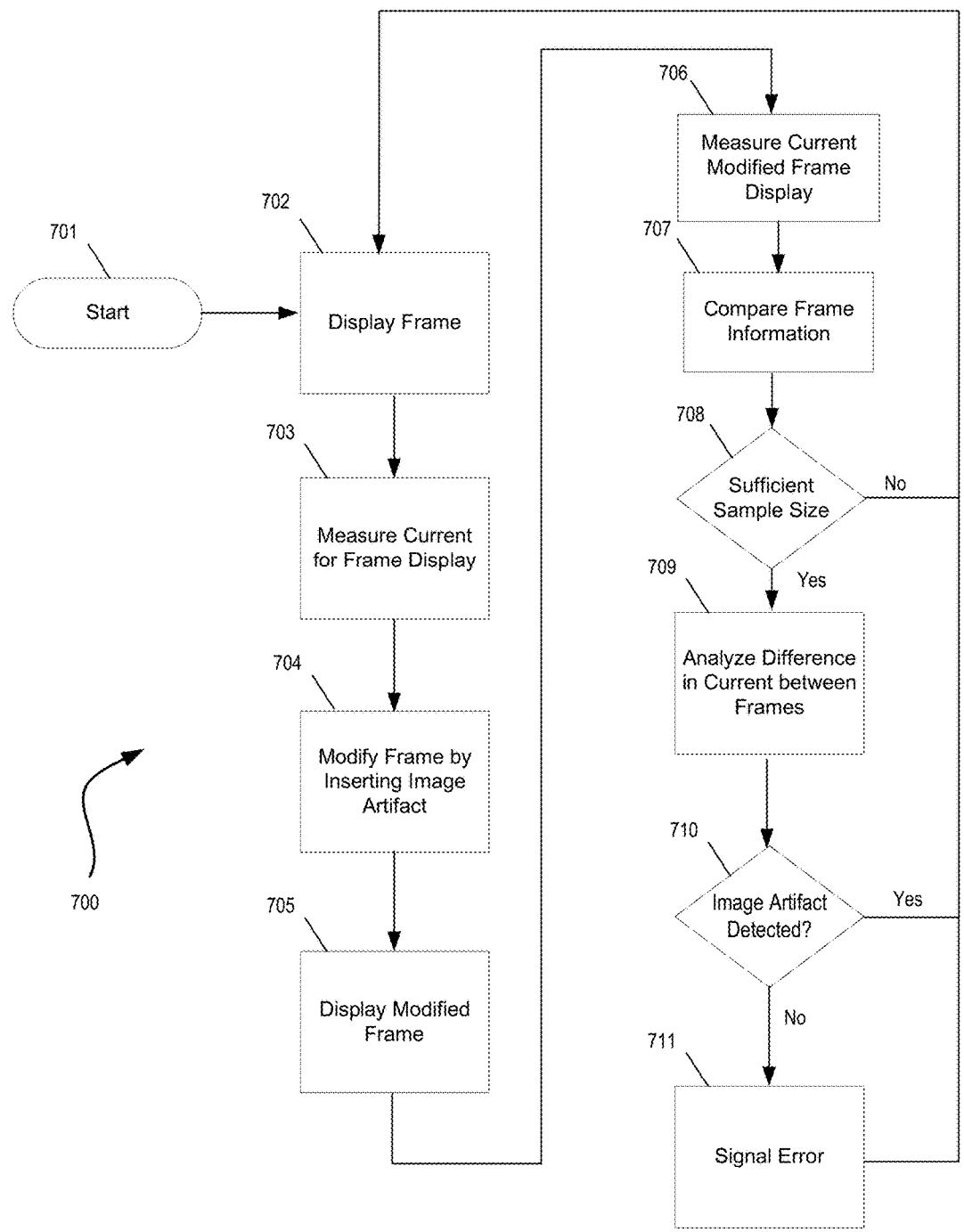
FIG. 7 is a flow diagram of a method in accordance with the present disclosure.

FIG. 7 shows a flow diagram 700 for a method of determining proper operation of a display screen. The method begins at block 701, where any required initialization of the display system can be performed. The method proceeds to block 702. At block 702, an image frame is displayed at a display screen and the method proceeds to block 703. At block 703 an indication of power consumption by the display screen, such as current, while displaying the image frame is measured. The power measurement can be performed such that multiple individual power measurements are performed for a plurality of time intervals during display of the image frame. Multiple measurements of a sufficient number are made to allow subsequent analysis to allow the display of an image artifact to be distinguished from non-display of the image artifact. In an embodiment, power can be measured for a time interval corresponding to each pixel of a displayed image frame. In another embodiment, current can be measured for groups of pixels of the displayed image frame.

At block 704, the image frame is modified by the insertion of an image artifact that has known characteristics. An image artifact is inserted by changing pixel values for one or more pixels of the received frame, for example by changing the luminance of the one or more pixels. An image artifact may be perceptible or imperceptible to users of the display screen. At block 705 the modified image frame is displayed on the display screen. At block 706, power consumed by the display screen while displaying the modified image frame is measured. Power measurements can be performed in the same manner as at block 703. From block 706, flow proceeds to block 707, where the power measurement information of the original frame is compared to the modified frame power measurement information. This comparison, which can be a difference, can be accumulated as previously described, and filtered as appropriate. Next, at block 708 it is determined whether a sufficient number of frame pairs have been processed. If not, flow returns to 702, otherwise, flow proceeds to block 709.

At block 709 the compared information from block 707 is analyzed. A large difference between frame pair measurements at a time corresponding to the display of the image artifact, as compared to times corresponding to when the image artifact is not displayed, can indicate the image artifact has been displayed, and thus indicate that the display is operating properly. It will be appreciated that filtering can be performed as part of the analysis at block 709. At block 710, a decision is made regarding detection of the image artifact. If the image artifact is not detected, the method proceeds to block 711 and an error is signaled. Otherwise, the method proceeds to block 702 for the display of a subsequent image frame.

Figure 8:
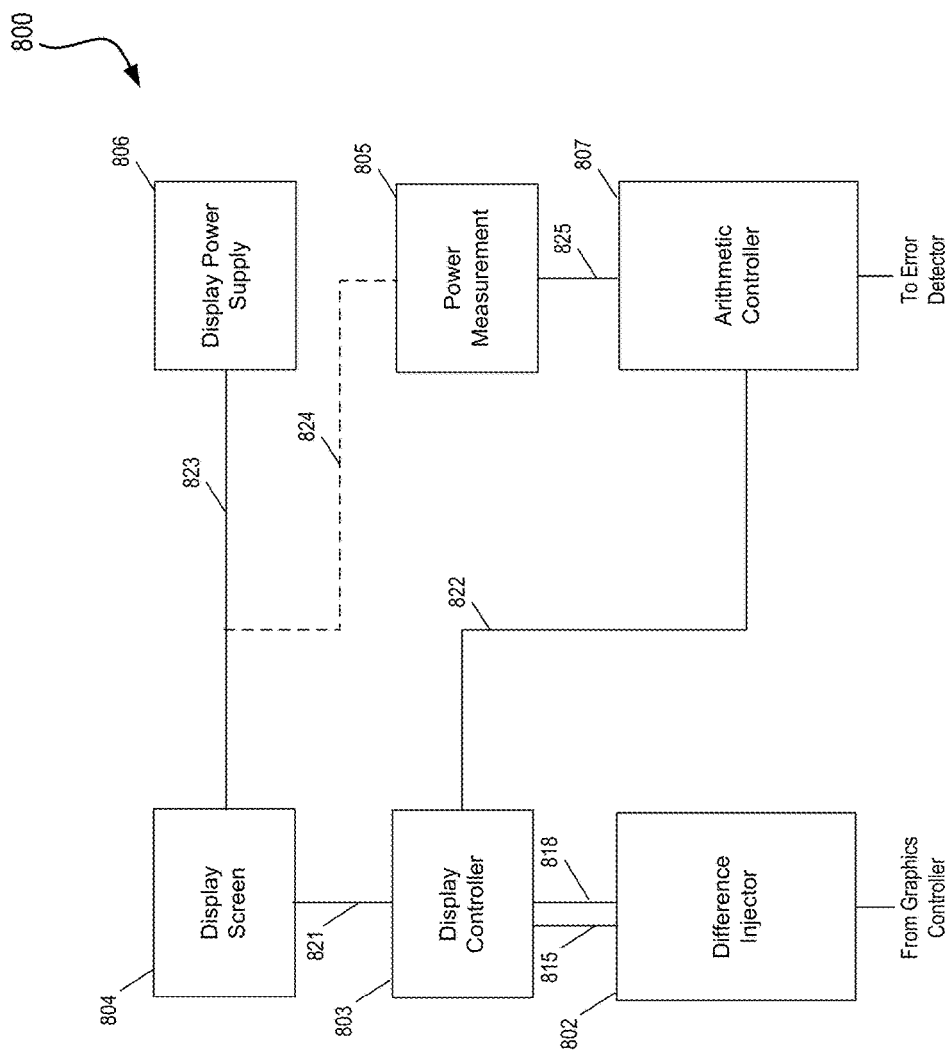
FIG. 8 illustrates a block diagram of a display system in accordance with another embodiment of the present disclosure.

In the foregoing specification, various embodiments have been disclosed. It will, however, be evident that various modifications and changes may be made therein without departing from the broader scope of these embodiments as set forth in the appended claims. For example, FIG. 8 illustrates an embodiment of a display system 800 that provides power to the display screen differently that that of display system 100, and has different connections between the display controller and the display screen. Specifically illustrated at FIG. 8 are a difference injector 802, a display controller 803, a display screen 804, a display power supply 806, a power measurement circuit 805, and an arithmetic controller 807.

During operation, the difference injector 802 receives original image frames from a graphics controller for display, and duplicates these original image frames to include an image artifact as previously described. Thus, difference injector 802 can have the same features and functionality as difference injector 102.

Display controller 803 receives odd and even frame pairs, via connections 815 and 818, wherein the even frame pair provides an image that includes an image artifact that is not present in the odd frame. Display controller 803 provides pixel information to the display screen 804 for each of the odd and even frames for display to a user. According to an embodiment, the signals provided to the display screen 804 are digital signals representing the various components of each pixel to be displayed. The display controller 803 further provides a frame indicator to connection 822 that indicates whether an even frame or an odd frame is being displayed, and can also indicate which pixels, or other portions, of an image frame is currently being provided to the display screen 804, thus allowing specific time intervals to be determined. Display controller 803 differs from display controller 103 in that power is not provided to the display 804 via the display controller 803. Instead, the connection 821 from the display controller to the display screen 804 can be any conventional or proprietary video connections, including an RGB cable, and HDMI cable, a DVI cable, a display port cable, a USB-C cable, and the like.

The display screen 804 is connected to the power supply 806 via a power connection 823. Upon receiving the image information from display controller 803, the display screen 804, which can include its associated circuitry used to convert received pixel information to actual images, will drive each one of its pixels individually. As described previously, the amount of power needed to drive an individual pixel will vary based upon the value of the pixel information. Thus, the amount of power consumed by the display screen 804 will vary based upon the actual image being displayed.

The display power supply 806 provides power to the display 804. In an embodiment, the display power supply 806 can be dedicated to providing power to display screen 804. In other embodiments, the display power supply 806 can also provide power to other portions of the system 800, wherein the power connection 121 represents only that portion of the power from power supply 806 that is provided to display screen 806. Regardless as to the configuration of the power supply 806, the power measurement circuit 805 monitors power to the display screen 804. It will be appreciated that the power provided to the display screen 804 can be detected at any one of several locations, depending on the specific configuration. For example, when the power supply 806 provides power to various other devices, the connection 824 can be connected at terminal of the display screen 804 itself, thus allowing just that portion of power used by the display screen to be detected. In another example, such as when the power supply 806 is a dedicated power supply, the connection 824 can be made at either the power supply 806, at the display screen 804, or at any other location of a power path between power supply 806 and display 804. It will also be appreciated that a power supply dedicated to providing power to the display screen 804 could incorporate power measurement circuitry 805. Connection 824 is illustrated as a dash line, to indicate the varying options as to where the connection 824 is connected. Note that the inclusion of connection 824 as a dashed line is not intended to imply other connections represented by solid lines don't also have multiple options as their specific configurations.

The power measurement information obtained by the power measurement circuit 805 is provided to the arithmetic controller 807 via data measurement connection 825 for processing as previously described with reference to arithmetic controller 807. The results from the arithmetic controller 807 are provided to an error detector as described above.

In a first aspect of the present disclosure, a display system comprises a display screen; a frame buffer to store an original image frame of a sequence of image frames; a difference injector coupled to the frame buffer to modify the original image frame by a known image artifact to generate a modified original image frame; a display controller coupled to the display screen to sequentially display the original image frame and the modified original image frame at the display screen; a power measurement circuit configured to measure an original frame power characteristic indicative of power consumed by the display screen during display of the original image frame, and to measure a modified frame power characteristic of power consumed by the display during display of the modified original image frame; an arithmetic controller to determine an original differential power characteristic between the original frame power characteristic and the modified original frame power characteristic; and an error detector to determine, based upon the first differential power characteristic, whether the known image artifact has been displayed on the display.

In one embodiment of the first aspect of the display the error detector includes an accumulator coupled to the arithmetic controller to maintain an accumulated differential power characteristic based upon the original differential power characteristic and a plurality of previously determined differential power characteristics between a number of corresponding previous image frames and previous modified image frames, and the error detector determines whether the known artifact has been displayed based on the accumulated differential power characteristic. In a more particular embodiment of the first aspect the error detector includes a filter coupled to the accumulator to provide a filtered result based upon a digital filter algorithm that is used to determine whether the known artifact has been displayed. In an even more particular embodiment of the first aspect the digital filter algorithm implements a differential power analysis that detects variations over a long period of time. In another even more particular embodiment of the first aspect the digital filter algorithm is configured to remove predefined frequency components.

In another more particular embodiment of the first aspect the error detector includes an analyzer coupled to the accumulator to determine based on the accumulated differential power characteristic whether the artifact has been displayed. In an even more particular embodiment of the first aspect the analyzer compares an accumulated power value of the accumulated differential power characteristic corresponding to a first time interval of a plurality of time intervals of a frame display period of the display system to a threshold value. In another even more particular embodiment of the first aspect the power measurement circuit is configured to measure the original frame power by providing a plurality of power measurements corresponding to a corresponding plurality of time intervals during a frame display period of the display system. In an even more particular embodiment of the first aspect each time interval of the plurality of time intervals corresponds to a different display screen location.

In another embodiment of the first aspect, the difference injector is configured to modify the luminance of at least one pixel value. In a further embodiment of the first aspect, the known image artifact injected by the difference injector requires an incremental display current when displayed that is less than current flow noise of the power consumed by the display.

A second aspect of the disclosure includes a method comprises receiving first image frame data; modifying the first image frame data to create modified first image frame data that includes an image artifact that is not part of the first image frame data; measuring a first power profile of power consumed by a display screen during display of the first image frame data on the display screen; measuring a first modified power profile of power consumed by the display screen while displaying the modified first image frame data on the display screen; analyzing a signal that is based on a first difference between the first power profile and the first modified power profile to determine if the image artifact was displayed on the display screen; and when the analysis indicates the image artifact was not displayed, providing a failure indicator, otherwise, not providing a failure indicator.

In one embodiment of the second aspect, the first image frame data comprises a set of pixels, and modifying the first image frame data comprises altering a subset of the set of pixels. In a more particular embodiment of the second aspect, altering the subset changes the luminance of each pixel in the subset. In another embodiment of the second aspect, display of the image artifact consumes a differential amount of power that is less than a variation in power consumption due to noise of the power being consumed by the display screen. In a further embodiment of the second aspect, analyzing the signal includes computing a first difference between each power reading of a plurality of power readings of the first power profile and a corresponding each power reading of the plurality of power readings of the modified first power profile, wherein corresponding readings are at a common time interval of a frame display duration.

In yet a further embodiment of the second aspect, analyzing the signal based on the differences between the first power profile and the first modified power profile, includes analyzing an accumulation of plurality of power profile differences for a plurality of frame pairs that includes a first frame pair corresponding to the first image frame and the modified first image frame. In a more particular embodiment of the second aspect, the plurality of power profile differences is for at least 100 frame pairs.

In a third aspect of the present disclosure, a method comprises measuring a first power profile of power consumed by a display screen during display of a first image on the display screen; measuring a second power profile of power consumed by the display screen during display of a second image on the display screen; and analyzing a signal that is based on a difference between the first power profile and the second power profile to determine if a predefined image artifact was displayed on the screen.

In one embodiment the third aspect further comprises, when the analysis indicates that the image artifact was not displayed, providing a failure indicator, otherwise, not providing the failure indicator.

It will be appreciated, that other embodiments of the invention can be made therein without departing from the broader scope of the invention as set forth in the appended claims. For example, in an embodiment, an image artifact can include a plurality of discontinuous portions of an image frame. In such an embodiment, power measurements of an image frame can indicate a plurality of peaks corresponding to the plurality of discontinuous portions of the image artifact.

The conductors as discussed herein may be illustrated or described in reference to being a single conductor, a plurality of conductors, unidirectional conductors, or bidirectional conductors. However, different examples may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various conductors carrying subsets of these signals. Therefore, many options exist for transferring signals.

It is to be understood that the architectures depicted herein are merely exemplary, and that in fact many other architectures can be implemented which achieve the same functionality. Furthermore, those skilled in the art will recognize that boundaries between the functionality of the above described operations merely illustrative.

What is claimed is:

1. A display system, comprising:
   a display screen;
   a frame buffer to store an original image frame of a sequence of image frames;
   a difference injector coupled to the frame buffer to modify the original image frame by a known image artifact to generate a modified original image frame;
   a display controller coupled to the display screen to sequentially display the original image frame and the modified original image frame at the display screen;
   a power measurement circuit configured to measure an original frame power characteristic indicative of power consumed by the display screen during display of the original image frame, and to measure a modified frame power characteristic of power consumed by the display during display of the modified original image frame;
   an arithmetic controller to determine an original differential power characteristic between the original frame power characteristic and the modified original frame power characteristic; and
   an error detector to determine, based upon the original differential power characteristic, whether the known image artifact has been displayed on the display.

2. The display system of claim 1, wherein the error detector includes an accumulator coupled to the arithmetic controller, the accumulator maintains an accumulated differential power characteristic based upon the original differential power characteristic and a plurality of previously determined differential power characteristics, wherein the plurality of previously determined differential power characteristics is determined from a number of corresponding previous image frames and previous modified image frames, and the error detector determines whether the known artifact has been displayed based on the accumulated differential power characteristic.

3. The display system of claim 2, wherein the error detector includes a filter coupled to the accumulator to provide a filtered result based upon a digital filter algorithm that is used to determine whether the known artifact has been displayed.

4. The display system of claim 3, wherein the digital filter algorithm implements a differential power analysis that detects variations over a long period of time.

5. The display system of claim 3, wherein the digital filter algorithm is configured to remove predefined frequency components.

6. The display system of claim 2, wherein the error detector includes an analyzer coupled to the accumulator to determine based on the accumulated differential power characteristic whether the artifact has been displayed.

7. The display system of claim 6, wherein the analyzer compares an accumulated power value of the accumulated differential power characteristic corresponding to a first time interval of a plurality of time intervals of a frame display period of the display system to a threshold value.

8. The display system of claim 6, wherein the power measurement circuit is configured to measure the original frame power by providing a plurality of power measurements corresponding to a corresponding plurality of time intervals during a frame display period of the display system.

9. The display system of claim 8, wherein each time interval of the plurality of time intervals corresponds to a different display screen location.

10. The display system of claim 1, wherein the difference injector is configured to modify the luminance of at least one pixel value.

11. The display system of claim 1, wherein the known image artifact injected by the difference injector requires an incremental display power when displayed that is less than noise of the power consumed by the display.

12. A method, comprising:
receiving first image frame data;
modifying the first image frame data to create modified first image frame data that includes an image artifact that is not part of the first image frame data;
measuring a first power profile of power consumed by a display screen during display of the first image frame data on the display screen;
measuring a first modified power profile of power consumed by the display screen while displaying the modified first image frame data on the display screen;
analyzing a signal that is based on a first difference between the first power profile and the first modified power profile to determine if the image artifact was displayed on the display screen; and
when the analysis indicates the image artifact was not displayed, providing a failure indicator, otherwise, not providing a failure indicator.

13. The method of claim 12, wherein the first image frame data comprises a set of pixels, and modifying the first image frame data comprises altering a subset of the set of pixels.

14. The method of claim 13, wherein altering the subset changes the luminance of each pixel in the subset.

15. The method of claim 12, wherein display of the image artifact consumes a differential amount of power that is less than a variation in power consumption due to noise of the power being consumed by the display screen.

16. The method of claim 12, wherein analyzing the signal includes computing a first difference between each power reading of a plurality of power readings of the first power profile and a corresponding each power reading of the plurality of power readings of the modified first power profile, wherein corresponding readings are at a common time interval of a frame display duration.

17. The method of claim 12, wherein analyzing the signal based on the differences between the first power profile and the first modified power profile, includes analyzing an accumulation of plurality of power profile differences for a plurality of frame pairs that includes a first frame pair corresponding to the first image frame and the modified first image frame.

18. The method of claim 17, wherein the plurality of power profile differences is for at least 100 frame pairs.

19. A method, comprising:
measuring a first power profile of power consumed by a display screen during display of a first image on the display screen;
measuring a second power profile of power consumed by the display screen during display of a second image on the display screen; and
analyzing a signal that is based on a difference between the first power profile and the second power profile to determine if a predefined image artifact was displayed on the screen.

20. The method of claim 19, further comprising:
when the analysis indicates that the image artifact was not displayed, providing a failure indicator, otherwise, not providing the failure indicator.

* * * * *